United States Patent [19]

Johnson

[11] Patent Number: 4,608,603
[45] Date of Patent: Aug. 26, 1986

[54] MICROPROCESSOR DRIVEN VIDEO GENERATOR

[75] Inventor: Brion Johnson, Quincy, Ill.

[73] Assignee: Harris Corporation, Melbourne, Fla.

[21] Appl. No.: 514,872

[22] Filed: Jul. 18, 1983

[51] Int. Cl.$^4$ ............................................. H04N 5/45
[52] U.S. Cl. ..................................................... 358/183
[58] Field of Search ................. 358/183, 224, 147, 29, 358/150

[56] References Cited

U.S. PATENT DOCUMENTS

| | | | |
|---|---|---|---|
| 3,927,250 | 12/1975 | Rainger | 358/146 |
| 3,982,064 | 9/1976 | Barnaby | 178/5.6 |
| 4,167,759 | 9/1979 | Tachi | 360/14 |
| 4,175,267 | 11/1979 | Tachi | 358/4 |
| 4,234,890 | 11/1980 | Astle et al. | 358/10 |
| 4,240,100 | 12/1980 | Gorbold et al. | 358/10 |
| 4,276,564 | 6/1981 | Watson et al. | 358/139 |
| 4,310,840 | 1/1982 | Williams et al. | 340/724 |

OTHER PUBLICATIONS

R. V. Capozzi, Video Mixer–IBM Technical Disclosure Bulletin, Apr. 1973, vol. 15, No. 11, p. 3558.
National Semiconductor NSC 800, Microprocessor Data Sheet.

Primary Examiner—Tommy P. Chin
Attorney, Agent, or Firm—Yount & Tarolli

[57] ABSTRACT

Television camera apparatus for generating auxiliary signals such as a VITC signal, an alphanumeric character generating signal, and a window signal for use in gating video related signals to camera adjustment circuitry. The apparatus includes a memory for storing data words representative of auxiliary signals to be generated, a microprocessor for accessing the data words from the memory, and a parallel-in/serial-out (PISO) shift register for receiving the accessed data words in parallel and for shifting them out bit serial so as to thereby generate the auxiliary signal. A first-in/first-out (FIFO) register interfaces the PISO shift register to the microprocessor and memory. The microprocessor uses an internal "refresh" register, normally used to refresh dynamic memories, to access data words for loading into the FIFO. The same circuitry is used for generating plural auxiliary signals.

18 Claims, 6 Drawing Figures

FIG. 4 A/N BUFFER

MICROPROCESSOR DRIVEN VIDEO GENERATOR

BACKGROUND AND FIELD OF THE INVENTION

The present invention relates to television cameras, and more particularly to television camera circuits for generating auxiliary signals, such as a signal for forming characters on the screen of the view finder of the camera, a vertical interval time code signal, a window signal for gating various video-related signals generated by the TV camera, etc.

The principal purpose of a television camera is, of course, to provide a color or black and white video signal representative of a scene being viewed by the camera. In the process of generating video signals, however, a television camera often generates a number of additional signals, all synchronized to the video signal being generated. It has, for example, been found desirable to record a time code signal along with the video signal to assist in the later editing of the recorded video. The two most popular time codes in the United States are the so-called SMPTE (Society of Motion Picture and Television Engineers) longitudinal time code (LTC) and vertical interval time code (VITC). Consequently, often a television camera will include circuitry for generating one or both of the two time codes to be recorded along with the video signal generated by the camera. Circuitry may also be included for providing an auxiliary signal which, when added together with the video signal being applied to the view finder associated with the camera, will result in the display of alphanumeric (A/N) information on the viewfinder screen. A camera may generate other auxiliary signals for gating the video signal or related signals to processing circuits for use in setting up the camera. It has conventionally been the practice to provide different circuitry for generating each different auxiliary signal.

SUMMARY OF THE INVENTION

It is an object of the present invention to provide an auxiliary signal generator circuit which utilizes the same circuitry for generating more than one different type of auxiliary signal.

It is another object of the present invention to provide a microprocessor driven auxiliary signal generator.

It is yet another object of the present invention to provide a signal generator circuit which can be used for generating both alphanumeric characters for display on a TV screen and an auxiliary signal for use in the set up procedures undertaken by the camera.

In accordance with one aspect of the present invention apparatus is provided for use in conjunction with a TV camera, comprising gate means for gating a video related signal generated by the camera to camera adjustment circuitry, where the gate means is responsive to a window signal so as to only gate selected portions of the video related signal to the camera adjustment circuitry, and window signal generating means for generating a window signal for application to the gate means. The window signal generating means comprises a memory for storing a bit pattern representing a recorded version of the window signal and means for converting the stored bit pattern into a serial bit stream serving as the window signal.

In accordance with another aspect of the present invention, apparatus is provided for generating auxiliary signals in synchronism with the video signal generated by a TV camera, comprising video character generating means for generating an auxiliary signal for forming alpha and/or numeric characters on a TV screen in synchronism with the video signal, where the video character generating means receives data from a memory for use in forming the auxiliary signals, and means for supplying the video character generating means with data representative of a vertical interval time code signal such that the auxiliary signals generated by the generating means includes the vertical interval time code signals.

In accordance with yet another aspect of the present invention apparatus is provided for generating an auxiliary signal for use in a television camera, comprising memory means for storing a plurality of data words representing the auxiliary signal, microprocessor means for accessing the memory to read out the data words one at a time, parallel-in/serial-out (PISO) shift register means for receiving data words in parallel and shifting them out bit serially at a rate synchronous with the video signals generated by the camera, first-in/first-out (FIFO) register means for receiving the words of data accessed from the memory by the microprocessor means, and, when enable, transferring one of the words of data into the PISO shift register means each time the previously transferred word has been fully shifted out of the PISO shift register means.

In accordance with still another aspect of the present invention, the microprocessor means includes a refresh register and, once each machine instruction cycle, provides the contents of the refresh register on a memory addressing bus and increments the contents of said register, and means are included for loading the FIFO with data words presented by the memory means in response to the refresh address.

BRIEF DESCRIPTION OF THE DRAWINGS

The foregoing and other objects and advantages of the present invention will become more readily apparent from the following detailed description, as taken in conjunction with the accompanying drawings, wherein:

FIG. 4 is a diagramatic representation of the arrangement of data in memory.

DETAILED DESCRIPTION

The TV camera described in the following detailed description is an electronic news gathering (ENG) camera intended to be used in conjunction with a video tape recorder. The apparatus of the present invention could, however, instead be used in conjunction with any other type of television camera.

Figure 1:
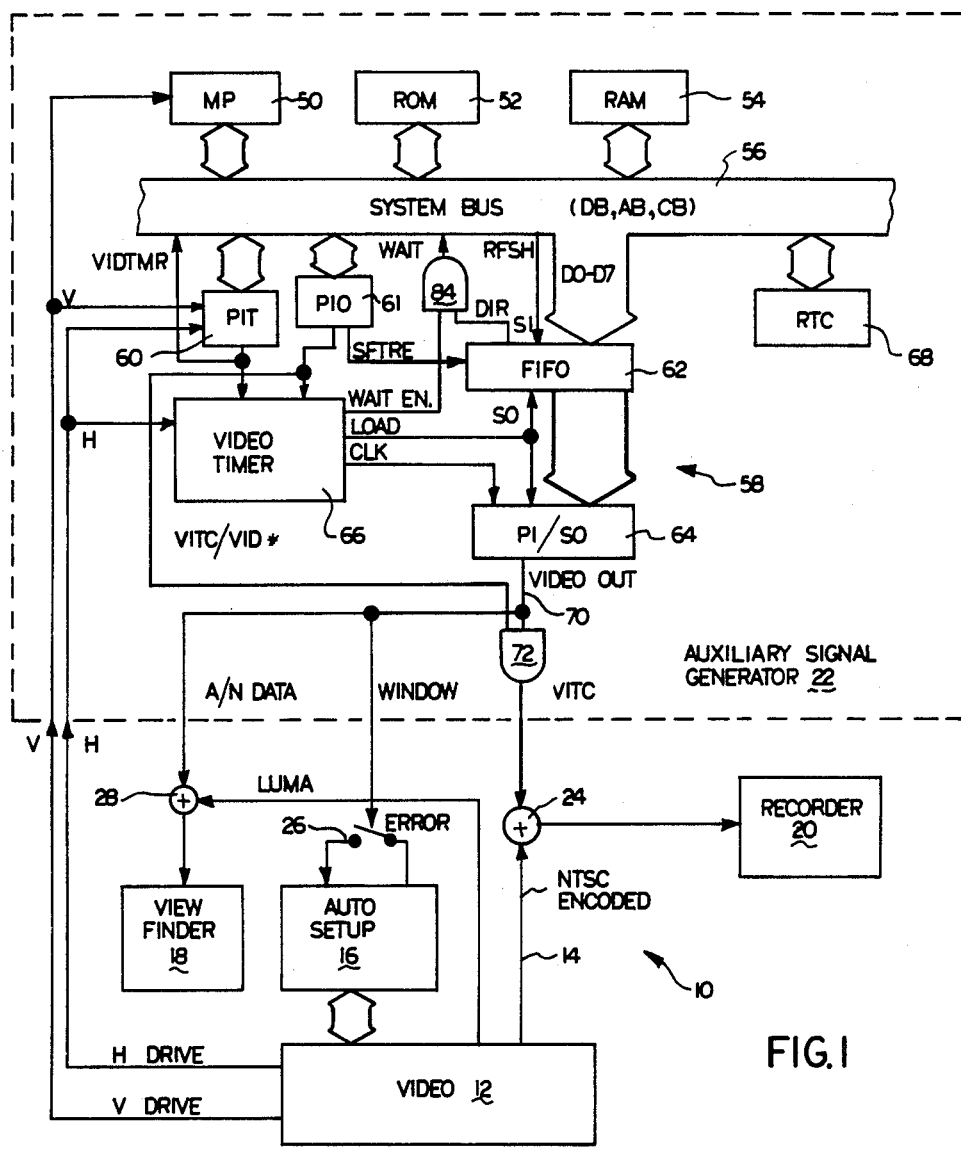
FIG. 1 is a block diagram of the TV camera apparatus in accordance with the teachings of the present invention.

FIG. 1 is a block diagram of a video camera. The camera includes a video signal generating and processing circuit 12 for generating an NTSC color video signal representative of a scene being imaged by the camera. The video generating and processing circuit 12 generally includes two or more (usually three) imaging devices upon which illumination from the scene is optically focused. The imaging devices may be either tubes (such as vidicons) or solid-state imagers. Typically, the illumination from the imaged scene is first separated into color components (e.g., red, blue, green), each of which is focused on a separate imaging device. The color signals provided by the three imaging devices are then processed and combined to generate the NTSC encoded signal. The NTSC signal is provided along an output line 14.

Associated with the video signal generating and processing circuit 12 is an auto set-up circuit 16. The auto set-up circuit 16 provides control signals for controlling the vertical and horizontal centering of the three color components, as well as for controlling white balance, vertical and horizontal size, etc. In the embodiment being described, the auto set-up circuit 16 is designed to adjust the control signals prior to normal use of the camera. The control settings then remain fixed during subsequent camera use. An auto setup circuit of this type is described in the commonly assigned patent application entitled "Automatic Registration Control System for Color Television Cameras", filed Feb. 3, 1983 under Serial No. 463,637. A view finder 18 is associated with the video camera 12 to permit the operator to monitor the picture being presented by the camera. The video signal displayed by the view finder 18 is provided by the video signal generating and processing circuit 12. In the example shown in FIG. 1, the view finder 18 displays only the black and white (i.e., the luma) part of the color video signal generated by the circuit 12.

The ENG camera shown in FIG. 1 is designed to be used outside of a studio environment, and thus is not directly connected to a camera control unit. A video tape recorder 20 is, however, associated with the camera for recording the NTSC encoded color signal generated by the camera. Preferably, the recorder 20 will simultaneously record time codes, either SMPTE LTC or VITC, along with the video signal for simplifying editing of the video tape at a later time.

In accordance with the present invention, the television camera 10 includes an auxiliary signal generator 22 for generating a number of different auxiliary signals used by the camera. The auxiliary signal generator 22 generates a vertical interval time code (VITC) signal, a window signal for use in gating error signals generated by the auto set up circuit 16, and an alphanumeric (A/N) character forming signal. The VITC signal is applied to signal combiner 24, which adds the VITC to the NTSC encoded signal VITC is thus automatically recorded by the video tape recorder 20 along with the NTSC encoded signal. The window signal controls a solid state switch 26 associated with the auto setup circuit. The switch is closed when the window signal has a logic "1" value, and is open when the window signal has a logic value of "0". The switch gates a register error signal so that the auto set up circuit 16 is selectively responsive to only those errors occurring when the window signal has a logic value of "1". This, in turn, only occurs during the portions of the imaged scene which are of the greatest interest, normally the central portion of the picture. The A/N character-forming signal is applied to a second signal adder circuit 28, which combines it with the luma signal provided to video viewfinder 18. The alphanumeric characters are thus displayed on the viewfinder along with the picture.

Conventionally, the auxiliary signals would each be generated by a separate signal generating circuit. In accordance with the present invention, however, the auxiliary signal generator 22 includes a single unified circuit structure for generating all three signals.

Before proceeding with a discussion of the content of the auxiliary signal generating circuit 22, it is appropriate to first review the general nature of the video signal and the three auxiliary signals produced by the camera. The video signal is derived by electronic scanning a video raster such as the raster 24 shown in FIG. 2. The video raster is comprised of a series of parallel horizontal lines which are scanned horizontally from left to right and vertically from top to bottom to form the video signal. The 525 lines in the NTSC television raster are separated into two fields, wherein each field includes 262 ½ horizontal lines, equally spaced across the raster. The two fields are vertically displaced from one another by a distance of one half of the vertical spacing between lines such that the lines formed in one field are interposed between the lines formed in the other field.

In a video signal, the 262 ½ video lines of each field occur sequentially, each line separated from the next by a distinctive horizontal blanking pulse. The last line of each field is separated from the first line of the next field by a distinctive vertical blanking pulse.

The auxiliary signals which are provided by the auxiliary signal generating circuit 22 are all synchronized with the horizontal and vertical timing of the video signal. The vertical interval time code (VITC) signal is inserted in the first several horizontal lines of each new field of the raster. The vertical interval time code is a series of binary ones and zeros presented in a specific format, where the digital content of the code identifies the hour, minute, second, frame and field number of the field currently being scanned. The entire vertical interval time code occupies only a single horizontal line, however for redundancy the code is repeated in another horizontal line, spaced from the first by a blank horizontal line. The three VITC lines are close enough to the top of the raster that they normally do not appear on a TV screen.

Figure 2:
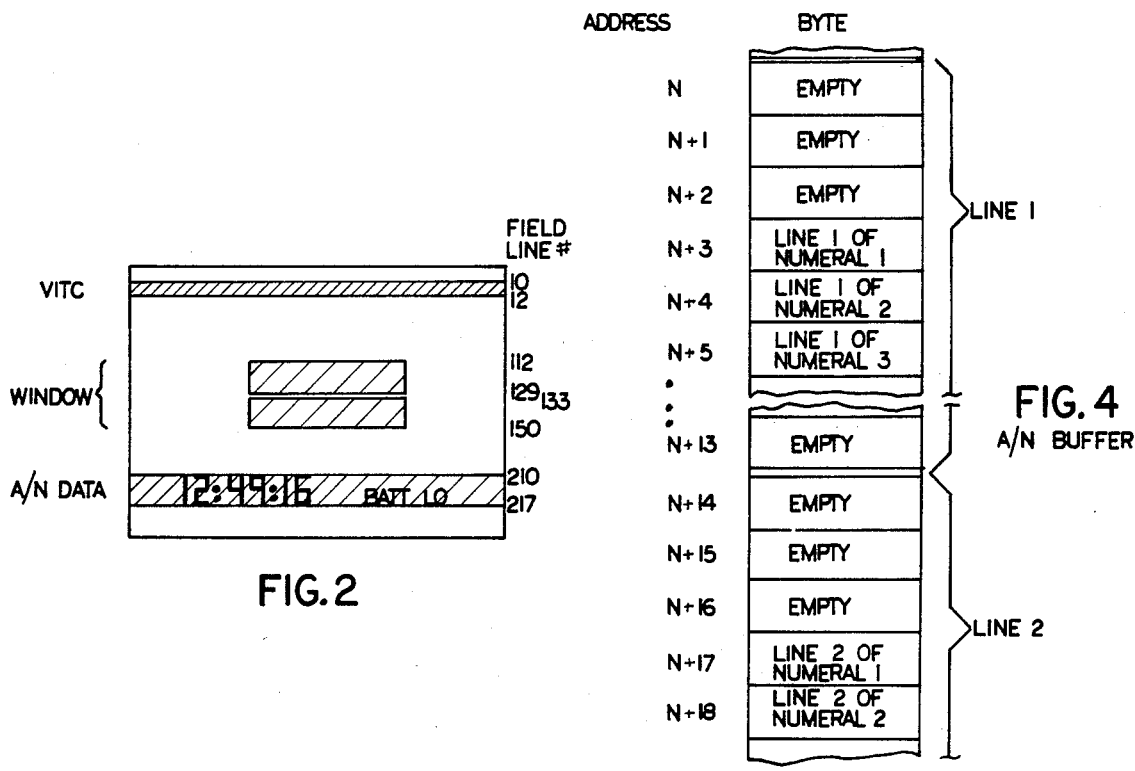
FIG. 2 is a representation of a TV raster.

The second auxiliary signal presented by the auxiliary signal generating circuit 22 is an alphanumeric (A/N) character-forming signal. The alphanumeric signal creates the character display shown in the lower part of FIG. 2. In FIG. 2 the A/N display created by the A/N signal shows real time in hours, minutes, and seconds, and also one of several camera status messages. The A/N signal has a binary value of "1" at times when a character stroke is to be painted on the screen, and a value of zero otherwise. Each numeral of the time display is displayed in an area having a height of eight horizontal lines (of one field—sixteen of a frame) and a width of eight serial binary bits (one byte). The actual numeral occupies a 5 bit by 7 line subset of that area. Changes of the numerals of the time display are relatively simple since each horizontal stroke of a numeral is contained in a single byte. The individual characters of the messages do not need to be changed, however, hence there is no advantage in each character stroke being held in a single byte. Thus, in the messages, each character stroke covers a smaller area but may nonetheless extend across parts of two bytes.

The third type of auxiliary signal presented by the auxiliary signal generating circuit 18 is a window signal. The window signal has a particularly binary value (e.g. "1") during the scan of the portion of the raster of primary interest, such as the center of the picture, and the opposite binary value otherwise. The window signal extends across approximately 75 horizontal lines of a frame.

Each of the three auxiliary signals generated by the auxiliary signal generator 22 contains information only during a confined portion of the scan of each field. Furthermore, the intervals during which the three signals contain information (sometimes referred to herein as display intervals) are nonoverlapping. The VITC signal extends over a display interval from lines 10 through 12 of each field, whereas the alphanumeric character-forming signal extends over a display interval from lines 210–217 of each field and the window extends over a display interval from approximately 112–150 lines. Because of the nonoverlapping nature of the three signals, a single general purpose circuit can be and is used to generate all three.

In the embodiment shown in FIG. 1, the auxiliary signal generator 22 includes a general purpose microcomputer and additional hardware for converting parallel binary bytes of data into a serial binary signal. The serial binary signal can serve as any one of the three auxiliary signals required of the generator 22. The microcomputer includes a microprocessor 50, a read only memory (ROM) 52, and a random access memory (RAM) 54. The three elements are interconnected by a system bus 56 which includes a data bus, an address bus, and a control bus. The microprocessor 50 reads machine language instructions from the read only memory 52, and executes the instructions in sequence so as to thereby control the operation of the auxiliary signal generator 22. The random access memory 54 provides scratch pad storage of variables used by the microprocessor during the execution of its stored program, and includes several buffer storage areas wherein data is stored before being accessed and converted into one of the three auxiliary signals.

Additional circuitry is connected to the system bus 56 for generating the auxiliary signals under control of the microcomputer. The additional circuitry 58 includes a programmable input-output circuit (PIO) 61, a programmable interval timer (PIT) 60, a first-in/first-out buffer memory (FIFO) 62, a parallel-in/serial-out register (PISO) 64, and a video timer circuit 66. The auxiliary signal generator 22 further includes a real time clock (RTC) 68 for use in initializing the vertical interval time code when the camera is first turned on.

The FIFO 62, PISO 64, and video timer 66 are enabled and disabled under control of the microprocessor 50, which in turn is triggered by "interrupts" provided by the programmable interval timer 60. The programmable interval timer receives horizontal and vertical drive pulses from the video generator and processing circuit 12, and effectively determines from the pulses which line is currently being provided at the output line 14 of the video generating and processing circuit 12. The programmable interval timer interrupts the microprocessor at the beginning of each interval during which one of the three auxiliary signals is to occur.

When triggered by the programmable interval timer, microprocessor 50 generates the appropriate auxiliary video signal by sequentially loading data bytes into the FIFO 62 from the appropriate buffer storage area in the random access memory 64. The bytes thus loaded into the FIFO 62 are then transferred into the PISO shift register 64, one byte at a time, under control of timing signals provided by the video timer 66. The video timer 66 also clocks the shift register 64, causing it to shift the stored data byte out of a video output terminal 70, one bit at a time. After an entire byte has been shifted out, a new byte is loaded into the shift register and serial output continues without interruption. The serial output signal represents the A/N signal, the VITC signal, or the window signal, depending upon the time during the frame at which it occurs and upon the data bytes used to form it. The output terminal 70 is directly connected to the adder 28 and switch 26. Consequently, both the adder 28 and the switch 26 receives all three auxiliary signals. The viewfinder 18 thus displays the A/N characters when that auxiliary signal is being generated, and displays the window when the camera is in the auto setup mode. (The window and A/N data signals are not both generated at any given time.) The output terminal 70 is also coupled to the VITC adder 24 through an AND gate 72. The AND gate 72 is controlled by the VITC/VID* output of PIO 61 and is enabled only when the VITC signal is being generated. Thus, only the VITC signal appears at the input of adder 24. The window and A/N signals are therefore not recorded by the video tape recorder 20.

The auxiliary signal outputted during each display interval is formed from a block of data bytes read one at a time from one of the buffer memory storage areas in RAM 54. The data bytes are read out sequentially during the display interval. Thus, for example, if only ten data bytes could be outputted in each horizontal line and there were ten horizontal lines in a given display interval, then a total of 10×10 or 100, data bytes would be stored in buffer memory for that display interval. Each group of ten adjacent bytes would then correspond to a single horizontal line.

The number of data bytes that can be outputted by the shift register 64 during each horizontal line is dependent upon the rate at which the bytes are clocked out of the PISO shift register. The A/N signal and the window signal use a 2.045 MHz clock rate, whereas the VITC signal uses a 1.79 MHz clock rate (i.e., one-half the color subcarrier frequency). When the 2.045 MHz clock is being employed, fourteen data bytes can be outputted in each horizontal line. When the 1.79 MHz clock is being used, however, only thirteen data bytes can be outputted in each horizontal line. The VITC memory thus comprises a sequence of 39 data bytes. The first thirteen data bytes are identical to the last thirteen data bytes, and correspond to the first and third horizontal lines of VITC. The middle group of thirteen bytes is, however, empty and thus one horizontal line between the two VITC lines will be completely empty. The alphanumeric data, however, consists of a sequence of 112 data bytes, wherein the first group of fourteen bytes represents the first line, the second group of fourteen bytes represents the second line, etc. The window, on the other hand, consists of a sequence of 252 data bytes, corresponding to the first 18 lines of the window. As mentioned previously, the entire width of the window is approximately 38 horizontal lines (or 76 of an entire frame). The total window is formed by repeating the reading of the window buffer area twice.

The contents of the buffer memory for the window remain unchanged because the window, itself, is static. The contents of the buffer memory for VITC and the buffer memory for the alphanumeric data, however, change with time. Each time the microprocessor receives a vertical drive pulse from the signal generating and processing circuitry 12, it increments the stored VITC time code and then reloads new data bytes into both the VITC buffer memory and the alphanumeric buffer memory to reflect the updated VITC values. FIG. 4 illustrates the general arrangement of data in the A/N buffer memory.

The auxiliary signal processor 22 is designed so that the data bytes can be loaded into the FIFO 62 from the buffer memory without substantial additional software or hardware. The technique used employs the inherent memory refreshing capabilities of the microprosessor. In the embodiment being described, the microprocessor 50 is a Zilog Z80 or an equivalent microprocessor such as the National Semiconductor NSC800. The Z80 and its equivalents include an internal register known as a "refresh" register for automatically refreshing dynamic memories with which the microprocessor may be associated. The auxiliary signal generator 22 utilizes the refresh (or "R") register along with the interupt (or "I") vector register to address the buffer memory for the purpose of loading the FIFO 62. To this end, the IR register pair within the microprocessor is loaded with an initial address representing the first location of a particular buffer storage area of the RAM. Each time the microprocessor executes a machine language instruction, it automatically provides an address on the system corresponding to the contents of the IR register. The RAM responds by providing the byte stored in the addressed memory location on the date bus, whereby it can be clocked into the FIFO 62 conveniently. The microprocessor automatically increments the refresh or R register before execution of the next instruction. When the next instruction is executed, the IR register pair again supplies an address to the data bus, however the address now points to the next sequential location in the buffer memory. The process is repeated continuously.

The operation of the refresh register is synchronized with the normal operation of the microprocessor, in that one refresh address is outputted for each machine instruction executed by the microprocessor. Other than this, however, the refreshing mechanism is essentially independent of the fetching and execution of instructions by the microprocessor. In particular, it does not impede normal program execution by the microprocessor. As used herein, it permits the FIFO 62 to be loaded quickly, and without substantial additional hardware.

Figure 3:
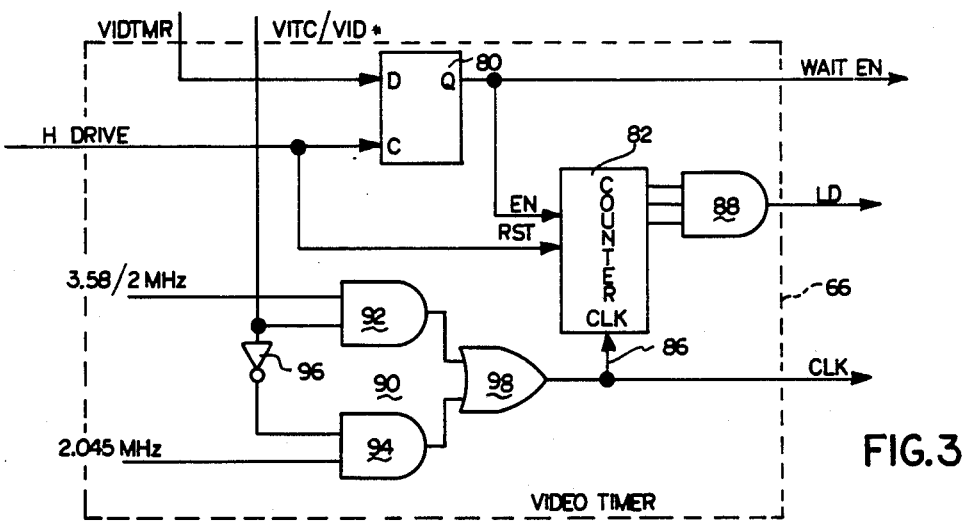
FIG. 3 is a more detailed block diagram of part of the FIG. 1 circuitry.

FIG. 3 is a block diagram of the video timer 66 of the apparatus of FIG. 1. The video timer is triggered by the VIDTMR output of the programmable interval timer 60 of FIG. 1. The video timer 66 is enabled to provide load and clock pulses to the shift register 64 whenever the VIDTMR output is high. The video timer 66 includes a type "D" flip-flop 80 for synchronizing the VIDTMR signal to the horizontal scanning of the video signal generating and processing circuit 12. The VIDTMR signal is applied to the D input of flip-flop 80, and the horizontal drive output of the video signal generating and processing circuit 12 is applied to the clock input of the flip-flop 80.

Normally, the VIDTMR output is low, and the video timer 66 is thus disabled. When a display interval begins, the VIDTMR output shifts high. The "Q" output of flip-flop 80 remains low, however, until the next horizontal drive pulse is received from the video signal generating and processing circuit 12. The horizontal drive pulse causes the high logic level to be transferred to the Q output of flip-flop 80, and also resets a counter 82. The high logic level signal then appearing at the output of flip-flop 80 enables the counter 82 and also enables an external AND gate 84 (FIG. 1). Clock pulses are provided to the counter at either a 2.045 or 1.79 MHz rate, both considerably in excess of the 15.750 KHz horizontal drive pulse frequency. The counter 82, once enabled, increments by one count for each clock pulse appearing on its clock input 86. The same clock signal is also applied to the "shift" input of shift register 64. The counter 82 thus increments in unison with the shifting of data out of the shift register 64.

An AND gate 88 has its three inputs coupled to the three lowest ordered bit outputs of counter 82, whereby the output of AND gate 88 shifts to a high logic level when the three lowest ordered bits of counter 82 are all at logic "one" levels. This only occurs once for every eight clock pulses. The output of AND gate 88 is applied to the "shift out" (SO) control terminal of FIFO 62, and also to the parallel/serial control terminal of shift register 64. Thus, each time a high logic level pulse appears at the output of AND gate 88, a new eight bit binary byte is presented to the parallel input lines of shift register 64 by the FIFO 62. The new byte is loaded into shift register 64 by the next clock pulse. The first bit position of the byte loaded into the shift register 64 appears at the output of the shift register immediately after the shift register is thus reloaded. The same clock pulse also causes the three lowest ordered bits within counter 82 to overflow, returning them to a zero binary value and thus removing the parallel load command from the shift register. The contents of shift register 64 are thereafter shifted out of the shift register by one bit position for each of the next succeeding seven clock pulses.

The video timer 66 includes gating circuitry 90 for gating one of the two different clock signals to the clock inputs of counter 82 and shift register 64. The gating circuitry is controlled by a (VITC/VID*) selection signal provided by the PIO circuit 60. The gating circuitry 90 includes two AND gates 92 and 94. AND gate 92 has one input connected to a clock source which is synchronous with the color subcarrier and has a frequency of 1.79 MHz (i.e., one-half of the color subcarrier frequency), whereas AND gate 94 has one of its inputs connected to a 2.045 MHz clock source. The VITC/VID* output signal provided by PIO circuit 60 is applied to the other input of AND gate 92 and is indirectly applied to the other input of AND gate 94 through an inverter 96. Thus, when the VITC/VID* signal is high, AND gate 92 is enabled to pass the 1.79 MHz clock signal, whereas AND gate 94 is disabled. Similarly, if the VITC/VID* output of PIO 60 is low, then AND gate 94 is enabled to pass the 2.045 MHz clock signal and AND gate 92 is disabled. OR gate 96 joins the outputs of the two AND gates 92 and 94 so as to thereby provide an output signal corresponding to either the 1.79 MHz or the 2.045 MHz clock signal, depending upon the logic state of the VITC/VID* selection line.

The hardware described above with respect to FIGS. 1 and 3 is controlled by software stored within the read only memory 52. The software includes an executive program which runs continuously except when the microprocessor is interrupted. The executive program checks manual switch positions, camera status, etc. If, for example, an "auto setup" switch on the control panel of the camera is depressed, the microprocessor initiates and controls auto setup functions. (The microcomputer controls the auto setup circuit 16 through control lines which are not shown in FIG. 1.). When initiating auto setup, the microprocessor sets a SETUP flag to indicate that the window is to be generated rather than the A/N character-forming signal. Other variables are also initialized for use in the interrupt servicing routines described hereinafter. At the conclusion of the auto setup routine the SETUP flag and other variables are reset to indicate that the A/N data signal is to be displayed once again.

Execution of the executive program can be interrupted by several different hardware-generated interrupts. Each vertical drive pulse, for example, interrupts the microprocessor and causes it to enter a routine which updates the VITC and reloads the VITC and A/N buffer memories. A second interrupt is caused by the VIDTMR output of the programmable interval timer 60, and causes the actual generation of the auxiliary signals. The second interrupt has priority over the first, and can thus interrupt execution of the first interrupt servicing routine.

The programmable interval timer 60 includes a counter which is incremented by the horizontal drive pulses provided by the video signal generating and processing circuit 12. When the count within the counter reaches a preprogrammed value, the VIDTMR output of the programmable interval timer 60 shifts to a high logic level, thereby interrupting whatever other operations are then being performed by the microprocessor and causing it to shift to the interrupt servicing routine shown in FIGS. 5 and 6. The VIDTMR interrupt occurs once at the beginning and once at the end of generation of VITC and similarly at the beginning and end of either the generation of the alphanumeric data or the window. (In the embodiment being described, the window and the alphanumeric data are not both displayed at the same time. The window is only generated during the manually initiated "set up" period prior to normal operation of the camera; standard alphanumeric data is displayed at all other times.)

Figure 6:
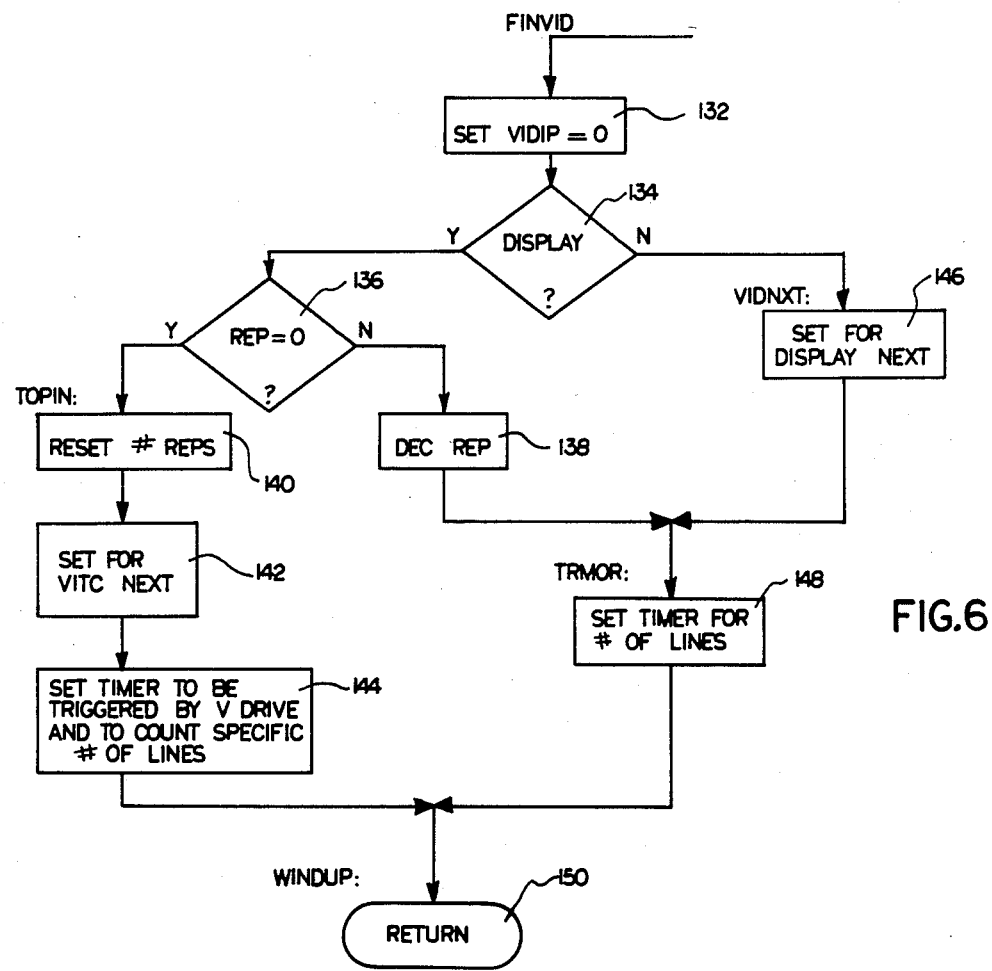
FIGS. 5 and 6 are flow charts indicating the flow of operations performed by the microprocessor used in the apparatus of the foregoing Figures.
Figure 5:
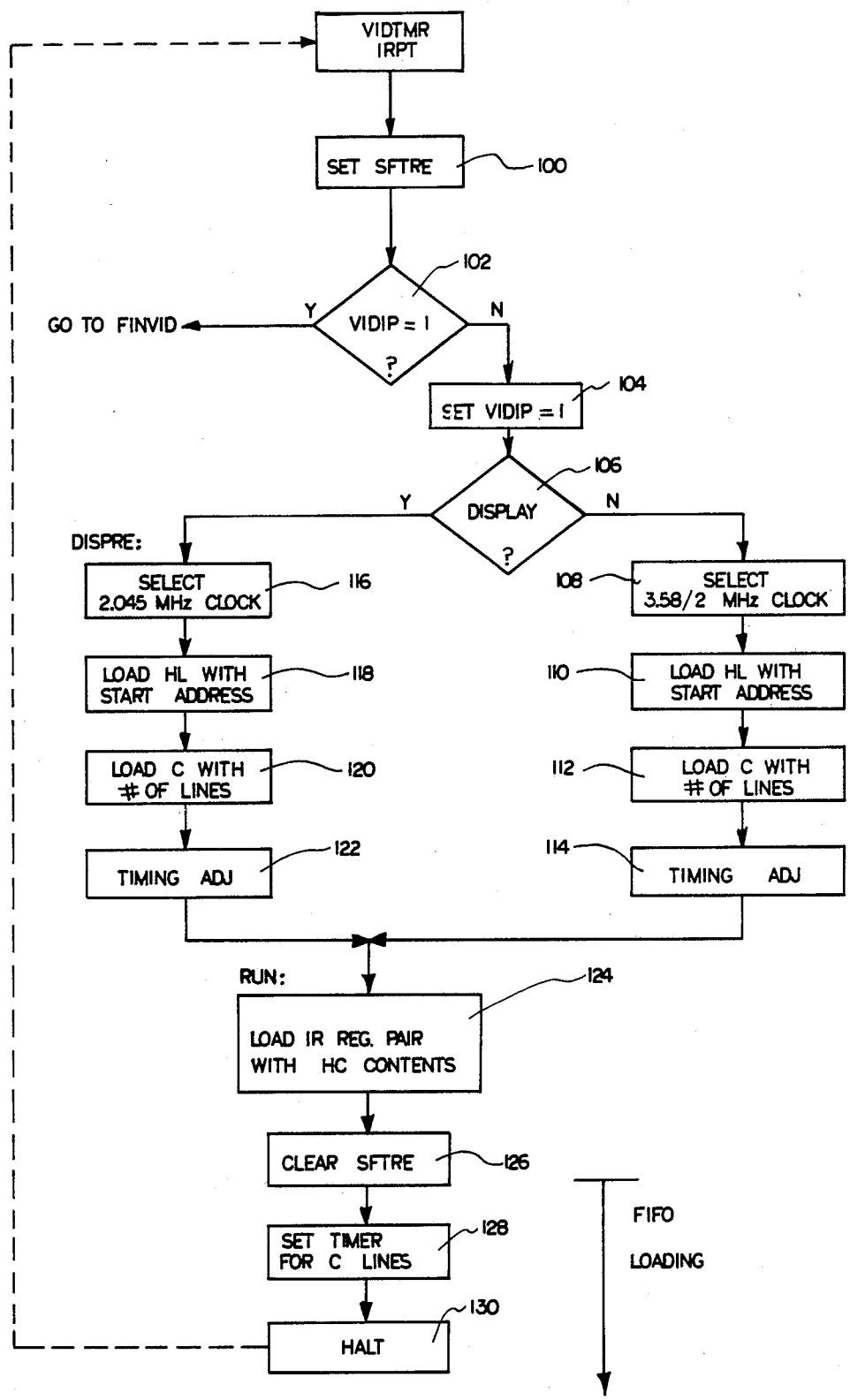

The interrupt servicing routine performed by the microprocessor after being interrupted by a VIDTMR interrupt is shown in FIGS. 5 and 6. Referring now to FIG. 5 the microprocessor starts with step 100 upon the occurrence of a VIDTMR interrupt. In step 100, the microprocessor sets the "SFTRE" (shift register enable) output of the PIO circuit 61, thereby disabling the FIFO circuit 62 from loading further bytes into the shift register 64, if data loading was in progress. The purpose of this step is to immediately terminate any auxiliary signal being generated upon the occurrence of a VIDTMR interrupt. The microprocessor then proceeds on to step 102, wherein the value of a flag "VIDIP" is examined. The VIDIP flag indicates whether the present interrupt signifies the beginning of a display interval or the end of a display interval. If VIDIP has a value of 1 (display done), the microcomputer jumps to the FINVID procedure shown in FIG. 6. Otherwise (display start), the microcomputer continues on with step 104. In step 104, the VIDIP flag is set to a value of 1 so that on the next pass through the VIDTMR interrupt routine, the microcomputer will go to the FINVID procedure of FIG. 6.

After completing step 104, the microprocessor proceeds on to step 106, wherein a DISPLAY flag is examined to determine whether VITC must be generated, or alphanumeric character or window information must be generated. If the DISPLAY flag indicates that the interrupt has occurred at the beginning of the display interval within which the window or alphanumeric characters are to be generated, the microprocessor jumps to step 116 to initialize various registers for display. Otherwise, the microprocessor proceeds with step 108.

In step 108, the microprocessor sets the VITC/VID* output of PIO 61 to a high logic level. This causes AND gate 92 (FIG. 3) to be enabled, thereby applying the 1.79 MHz clock frequency to the counter 82 of FIG. 3 and the shift register 64 of FIG. 1. The microprocessor then proceeds to step 110, wherein the HL register pair within the microprocessor is loaded with the address of the first location in the random access memory 64 of the buffer containing the VITC information. In the succeeding step 112 the C register of the microprocessor is loaded with the number of horizontal lines over which the VITC information is to be outputted. A small delay is inserted at step 114 so as to properly time this portion of the program to hardware timing. The microcomputer then jumps to step 124 to begin the actual outputting of the VITC data.

If it had instead been determined back in step 106 that the interrupt represented the beginning of a window or A/N portion of the picture, the microcomputer would have jumped to step 116 instead of proceeding with step 108. In step 116 the 2.045 MHz clock signal would have been selected by resetting the VITC/VID* output of PIO 61 to a low level. This would have enabled AND gate 94, thereby applying the 2.045 MHz clock signal to the counter 82 and the shift register 64. The microcomputer would then have proceeded to step 118, wherein the HL register pair would have been loaded with the start address of the portion of RAM 64 containing the window or the A/N data to be outputted (depending upon the state of the SETUP flag). After then proceeding through a timing adjustment step 122, similar to the timing adjustment step 114 but possibly having a differing timing value, the microcomputer would continue on with step 124.

In step 124, the IR register pair of the microprocessor is loaded with the contents of the HL register pair, whether loaded in step 110 or in step 118. In step 126, the shift register enable signal "SFTRE" output of programmable input-output 61 is cleared to enable the FIFO 62 to begin accepting data from the system bus 56. This initiates the actual outputting of data from the auxiliary signal generator 22. In step 128, the microprocessor sets the programmable interval timer 60 to count "C" horizontal lines. The microprocessor then enters a halt state in step 130.

The loading of the FIFO 62 begins as soon as the SFTRE flag is cleared in step 126. Each time the microprocessor 50 subsequently executes one of the machine language instructions in the interrupt routine stored in ROM 52, it provides a refresh address (the contents of the IR register pair) upon the address bus portion of the system bus 56, thereby causing the RAM 54 to output a byte of data from the memory location identified by the address. The R register is then incremented so that the next refresh address points to the next sequential location in memory. Since the address is taken from the IR register pair, and since the IR register pair was loaded (step 124) with the address corresponding the beginning of the buffer memory storage area of RAM 54, the data bytes outputted from RAM 54 through this process correspond to the data bytes stored in the buffer memory location within the RAM 54. Each time one of these data bytes appears on the data bus portion of the system bus 56, it is latched into the FIFO 62 by a "refresh" signal generated by the microprocessor 50. The refresh signal is delayed by a flip-flop (not shown) so that it occurs at a time coincident with the appearance of the data byte on the data bus DB.

Data bytes are thus accessed from sequential buffer memory locations in the RAM 54 and loaded into the FIFO 62. The loading of FIFO 62 occurs at a rapid rate, since one new data byte is loaded into the FIFO each time an instruction is fetched and executed by the microprocessor 50. All of the 16 memory locations in the FIFO 62 will therefore quickly fill up. When the FIFO becomes full, its "DIR" output shifts to a high logic level, thereby causing the output of AND gate 84 to similarly shift to a high logic level. The output of AND gate 84 is connected to the WAIT input of microprocessor 50, and thus causes the microprocessor 50 to enter a WAIT state. As long as the microprocessor is "WAIT"-'ing, no instructions are executed and no refresh address is applied to the system bus. Thereafter, each time a data byte is read out of the FIFO 62 by the shift register 64, the DIR output of FIFO 62 drops low. The microprocessor thus leaves the WAIT state, only to reenter it again after executing a single instruction. (The execution of one instruction causes one data byte to be loaded into FIFO 62, thus filling it up again and causing its DIR output to again shift high, whereupon the microprocessor reenters the WAIT state.)

Thus, data bytes are loaded into the FIFO 62 from the RAM 54. As described previously, the data bytes are then transferred into the shift register 64 from the FIFO 62. The data bytes are serially shifted out of the register, thereby forming the video data which is used for VITC, the window, or alphanumeric data. This procedure continues until the next VIDTMR interrupt occurs.

The execution of the machine language instructions of the interrupt routine continues concurrently with the loading of FIFO 62. Thus, the microprocessor works its way through step 128, eventually halting at step 130. When in the halt state, the microprocessor does not execute program instructions but does still provide sequential refresh addresses on the address bus portion of the system bus 56. The microprocessor remains in the halt state (being periodically shifted to a WAIT state by the output of AND gate 84) until the next VIDTMR interrupt. At the same time, the programmable interval timer counts horizontal lines by counting horizontal drive pulses. The programmable interval timer 60 soon reaches a terminal count corresponding to the number of horizontal lines preset in step 128. At that time, the programmable interval timer provides the next VIDTMR interrupt to the microprocessor 50, causing it to return to step 100 to begin a second interrupt processing cycle.

In the second interrupt processing cycle, the microcomputer will be shunted to the FINVID procedure by step 102 since the VIDIP flag is set (having been set to a value of one at step 104 in the first VIDTMR interrupt processing cycle). The microprocessor will thus jump to step 132 of the FINVID procedure of FIG. 6. In step 132 the VIDIP flag is first returned to a value of zero. The microprocessor then executes step 134, wherein the display flag is once again examined to determine whether the portion of the video raster at which the interrupt occurred corresponds to the VITC area or the window or A/N data area. If the display flag indicates that the portion of the raster currently being scanned corresponds to the area wherein either alphanumeric data or window data is to be displayed, the microprocessor proceeds to step 136.

In step 136, the microprocessor examines a repetition counter to determine whether or not to repeat the outputting of the information whose outputting has just been completed. In the embodiment being described, the outputting of window data is repeated to circumvent the limited automatic addressing ability of the refresh circuitry. Specifically, during memory refreshing the microprocessor 50 increments only the R register portion of the IR register pair. Because the R register is only 8 bits wide, only 256 different sequential memory locations can be accessed by the IR register pair automatically. Thus, if fourteen data bytes can be displayed per horizontal line, then only 18 lines of video data (of each field) can be provided. In the described embodiment, it was desired that the window be more than 36 horizontal lines high. Consequently the window outputting is simply repeated to produce the desired window height.

The repetition of the output of data is controlled by the repetition counter. If it is determined in step 136 that the repetition counter does not have a value of zero, the microprocessor proceeds to step 138, wherein the repetition counter is decremented. The microprocessor jumps to step 148 after step 138.

If the repetition counter does have a value of zero, the microprocessor jumps to step 140, wherein the repetition counter is reset to its original value. (The "original value" is zero when the camera is in the mode for displaying A/N data, and is one when the camera is in the mode for generating a "window" signal.) The microprocessor then proceeds to step 142, wherein the display flag is set to indicate in subsequent steps 106 and 134 that VITC is to be displayed. In step 144 the microprocessor interrupt is disabled (it will be re-enabled immediately after the next vertical drive pulse) and the programmable interval timer 60 is set to a "monostable" mode. When in the monostable mode, the output of PIT 60 is initially low, but shifts high when triggered by the next vertical drive pulse. The PIT output then remains high until after a specified number of horizontal drive pulses have been received. The next VIDTMR interrupt will thus occur a predetermined number of horizontal lines after the beginning of the scan of the next field. After step 144, the microprocessor proceeds to step 150 and performs various windup procedures.

If it had been determined in step 134 that the outputting of VITC, rather than display information had just been completed, the microprocessor would have jumped to step 146. In step 146 the display flag would be set so as to indicate that the next information to be outputted was display information (either A/N or window). The microprocessor would then continue to step 148, wherein the timer would be set to count a number of horizontal lines corresponding to the separation between the last line of VITC and the first line at which the outputting of display data was to begin. (If step 148 were arrived at by way of step 138, however, the timer would be set to count a minimum number of lines so that the vertical separation between the two halves of the window would be minimized.)

In the next step 150, the microprocessor clears miscellaneous variables. After step 150, the microprocessor returns to whatever "background" operations had been in progress at the time that the interrupt occurred which initiated the outputting of data by the auxiliary signal generator 22.

Although the invention has been described with respect to a preferred embodiment, it will be appreciated that various rearrangements and alterations of parts may be made without departing from the spirit and scope of the present invention, as defined in the appended claims.

What is claimed is:

1. Apparatus for use in conjunction with a television camera which generates a video-related signal and which includes adjustment circuitry for adjusting camera operation in accordance with said video-related signal, comprising:
   gate means for gating said video-related signal to said adjustment circuitry, said gate means being controlled by a window signal so as to gate only selected portions of said video-related signal to said camera adjustment circuitry, and
   window signal generating means for generating said window signal, said window signal generating means comprising memory means for storing said window signal, means for reading said stored window signal from said memory means in synchronism with said video-related signal, and means for applying the resulting window signal to said gate means;
   said memory means comprises a digital memory for storing a bit pattern representative of said window signal, and wherein said reading means comprises means for reading out said bit pattern in bit serial fashion and in synchronism with said video-related signal so as to thereby generate a serial stream of binary bits representing said window signal;
   said reading means comprises means for receiving words from said memory means in parallel, and means coupled to said receiving means for converting said parallel words into said serial stream of binary bits.

2. Apparatus as set forth in claim 1 wherein said parallel to serial converter means comprises a register for receiving said words in parallel and for shifting said words out bit serial at a rate related to the horizontal scanning rate of said video signal, and further wherein said receiving means comprises means for receiving parallel words from said memory means at a first rate and for providing said parallel words to said parallel to serial converter means at a second rate synchronous with said shifting rate.

3. Apparatus as set forth in claim 2, wherein said receiving means is a first-in, first-out register.

4. Apparatus for use in conjunction with a television camera which generates a video-related signal and which includes adjustment circuitry for adjusting camera operation in accordance with said video-related signal, comprising:
   gate means for gating said video-related signal to said adjustment circuitry, said gate means being controlled by a window signal so as to gate only selected portions of said video-related signal to said camera adjustment circuitry, and
   window signal generating means for generating said window signal, said window signal generating means comprising memory means for storing said window signal, means for reading said stored window signal from said memory means in synchronism with said video-related signal, and means for applying the resulting window signal to said gate means;
   said memory means comprises a digital memory for storing a bit pattern representative of said window signal, and wherein said reading means comprises means for reading out said bit pattern in bit serial fashion and in synchronism with said video-related signal so as to thereby generate a serial stream of binary bits representing said window signal;
   said gate means is closed when said window signal has a first logic value and is open when said window signal has the opposite logic value, and wherein said bit pattern stored in said digital memory means is selected such that, when read out in bit serial fashion by said reading means, said window signal has a first logic value during portions of said video related signal which are not of interest and the opposite logic value during portions which are of interest.

5. Apparatus for use in conjunction with a television camera which generates a video-related signal which is synchronous with the vertical and horizontal timing of said television camera, said camera also including adjustment circuitry for adjusting camera operation in accordance with said video-related signal, comprising:
   gate means for gating said video related signal to said adjustment circuitry, said gate means being controlled by a window signal so as to gate only selected portions of said video related signal to said camera adjustment circuitry,
   window signal generating means for generating said window signal, said window signal generating means comprising digital memory means for storing a bit pattern representative of said window signal, and means for reading said bit pattern out of said memory means in bit serial fashion such that each bit of said bit pattern occurs at the same time as corresponding portions of said video signal, relative to said vertical and horizontal timing, and wherein said bit pattern is selected such that, during reading out, bits occurring at the same time as portions of said video related signal which are not of interest have a first binary value, and bits occurring at the same time as portions of said video related signal which are of interest have the opposite binary value; and
   means for combining said window signal with a video signal generated by said camera so as to thereby provide a combined video signal which, when displayed on a television screen, will show the location of the window relative to the television picture.

6. Apparatus for use in conjunction with a television camera which generates a video-related signal which is synchronous with the vertical and horizontal timing of said television camera, said camera also including adjustment circuitry for adjusting camera operation in accordance with said video-related signal, comprising:
   gate means for gating said video related signal to said adjustment circuitry, said gate means being controlled by a window signal so as to gate only selected portions of said video related signal to said camera adjustment circuitry,
   window signal generating means for generating said window signal, said window signal generating means comprising digital memory means for storing a bit pattern representative of said window signal, and means for reading said bit pattern out of said memory means in bit serial fashion such that each bit of said bit pattern occurs at the same time as corresponding portions of said video signal, relative to said vertical and horizontal timing, and wherein said bit pattern is selected such that, during reading out, bits occurring at the same time as portions of said video related signal which are not of interest have a first binary value, and bits occurring at the same time as portions of said video related signal which are of interest have the opposite binary value; and said memory means also stores a second bit pattern to be read out bit serial by said reading means and combined with said video signal by said combining means, said second bit pattern being selected so that the bit pattern forms a selected alpha and/or numeric character display on a television screen.

7. Apparatus as set forth in claim 6, and further comprising means for causing said reading means to read out only one of said first and second bit patterns.

8. Apparatus for use in conjunction with a television camera which generates a video-related signal which is synchronous with the vertical and horizontal timing of said television camera, said camera also including adjustment circuitry for adjusting camera operation in accordance with said video-related signal, comprising:

gate means for gating said video related signal to said adjustment circuitry, said gate means being controlled by a window signal so as to gate only selected portions of said video related signal to said camera adjustment circuitry, window signal generating means for generating said window signal, said window signal generating means comprising digital memory means for storing a bit pattern representative of said window signal, and means for reading said bit pattern out of said memory means in bit serial fashion such that each bit of said bit pattern occurs at the same time as corresponding portions of said video signal, relative to said vertical and horizontal timing, and wherein said bit pattern is selected such that, during reading out, bits occurring at the same time as portions of said video related signal which are not of interest have a first binary value, and bits occurring at the same time as portions of said video related signal which are of interest have the opposite binary value; and said memory means also stores a third bit pattern to be read out bit serial by said reading means and combined with a video signal generating by said television camera, said third bit pattern being coded to contain information identifying the specific frame and/or field with which the bit patter is combined.

9. Apparatus as set forth in claim 8, wherein said third bit pattern comprises a vertical interval time code.

10. Apparatus as set forth in claim 8, and further comprising timing means for causing said reading means to read out said third bit pattern at a first time relative to said vertical timing and to read out said first bit pattern at a second time relative to said vertical timing.

11. Apparatus as set forth in claim 10, wherein said timing means causes said reading means to read out said third bit pattern during the first several horizontal lines of each field of said video signal.

12. Apparatus for generating a vertical interval time coded signal in synchronism with a video signal generated by a television camera, comprising:

microcomputer means for keeping track of the frame number and field number of fields of video as they are generated by said camera, said microcomputer means being programmed to store words of time code data identifying said frame and field number of the current said field of said video signal;

parallel-in/serial-out (PISO) shift register means for receiving data words in parallel and shifting them out bit serially;

first-in/first-out (FIFO) register means for receiving said words of data from said microcomputer and for transferring one of said words into said PISO shift register means, in parallel, each time the previous word has been shifted out of said PISO shift register means;

first timing means for controlling the timing of operation of said FIFO and PISO register means such that said words identifying said frame and field numbers are shifted out bit serial during at least one of the first several horizontal lines of each said field;

means for combining said video signal and the serial bit stream generated by said PISO, whereby the vertical interval of each field of said video signal includes said time code signal;

said time code signal;

said microcomputer means includes microprocessor means and random access memory means, wherein said microprocessor means includes a refresh register and, once each machine instruction cycle, provides the contents of said refresh register on a memory addressing bus and increments the contents of said register, and wherein means are included for loading said FIFO with data words presented by said random access memory means in response to said refresh adresses;

said microprocessor means is programmed to load said refresh register with an initial address identifying the random access memory location of the first word to be read out of said memory and to thereafter enable said FIFO register to begin accepting data words from said memory in response to said refresh addresses; and said first timing means includes second timing means for interrupting said microprocessor means at a selected horizontal line of at least one field of said video signal, and wherein said microprocessor means is programmed to respond to said interrupt by loading said refresh register with an initial address identifying the random access memory location of the first word of a first group of words to be read out of said memory, said first group including said field and frame identifying words, and to thereafter enable said FIFO register to begin accepting data words from said memory in response to said refresh addresses.

13. Apparatus as set forth in claim 12, wherein said second timing means also interrupts said microprocessor means at a different selected horizontal line of said field of said video signal, and wherein said microprocessor means is programmed to respond to said interrupt by loading said refresh register with a different said initial address identifying the random access memory location of the first word of a different group of words to be read out of said memory, and to thereafter re-enable said FIFO register to begin accepting data words from said memory in response to said refresh addresses.

14. Apparatus as set forth in claim 13, wherein said different group of words are such so as to create a selected group of characters when the combined video signal is displayed on a TV screen.

15. Apparatus as set forth in claim 13, wherein said different group of words are such that the serial bit stream generated by said PISO in response to said words has a selected binary value during portions of said video signal corresponding to selected large areas of the television picture represented by said video signal, and wherein said apparatus further comprises gating means for gating another of the signals generated by said television camera, in response to the binary value of said serial bit stream.

16. Apparatus as set forth in claim 13, and further comprising camera setup means for automatically adjusting camera control voltages in response to errors in the video signals generated by said camera so as to adjust said camera for proper functioning, said camera setup means being responsive to errors in said video signals only during the time that a gating signal has a selected binary value, and wherein said gating signal is the serial bit stream generated by the PISO.

17. Apparatus for generating an auxiliary signal for use in a television camera, comprising:

memory means for storing a plurality of data words representing said auxiliary signal;

microprocessor means for accessing said memory to read out said data words, one at a time;

parallel-in/serial-out shift (PISO) register means for receiving data words in parallel and for shifting them out bit serially at a rate synchronous with the video signals generated by said camera;

first-in/first-out (FIFO) register means for receiving said words of data accessed from said memory by said microprocessor means, and for, when enabled, transferring one of said words of data into said PISO shift register means each time the previously transferred word has been fully shifted out of said PISO shift register means;

said microprocessor means includes a refresh register and, once each machine instruction cycle, provides the contents of said refresh register on a memory addressing bus and increments the contents of said register, and wherein means are included for loading said FIFO with data words presented by said memory means in response to said refresh addresses; and timing means for interrupting said microprocessor means at a selected horizontal line of at least field of a video signal generated by said camera, and wherein said microprocessor menas ins programmed to respond to said interrupt by loading said refresh register with an initial address identifying the memory location of the first word to read out of said memory and to thereafter enable said FIFO register to begin accepting data words provided by said memory in response to said refresh addresses.

18. Apparatus for generating an auxiliary signal for use in a television camera, comprising:

memory means for storing a plurality of data words representing said auxiliary signal;

microprocessor means for accessing said memory to read out said data words, one at a time;

parallel-in/serial-out shift (PISO) register means for receiving data words in parallel and for shifting them out bit serially at a rate synchronous with the video signals generated by said camera;

first-in/first-out (FIFO) register means for receiving said words of data accessed from said memory by said microprocessor means, and for, when enabled, transferring one of said words of data into said PISO shift register means each time the previously transferred word has been fully shifted out of said PISO shift register means; and said data words are such that said auxiliary signal is a gating signal for gating a video-related signal generated by said camera adjustment circuitry associated with said camera.

* * * * *